US011288133B2

(12) United States Patent
Khan et al.

(10) Patent No.: US 11,288,133 B2
(45) Date of Patent: Mar. 29, 2022

(54) SYSTEM AND METHOD FOR RESILIENT DATA PROTECTION

(71) Applicant: EMC IP Holding Company LLC, Hopkinton, MA (US)

(72) Inventors: Asif Khan, Bangalore (IN); Amith Ramachandran, Bangalore (IN); Amarendra Behera, Bangalore (IN); Deepika Nagabushanam, Bengaluru (IN); Ashish Kumar, Bangalore (IN); Pati Mohan, Bangalore (IN); Tushar Dethe, Bangalore (IN); Himanshu Arora, Bangalore (IN); Gururaj Soma, Bangalore (IN); Sapna Chauhan, Bangalore (IN); Soumen Acharya, Bangalore (IN); Reshmee Jawed, Bengaluru (IN); Shelesh Chopra, Bangalore (IN); Yasemin Ugur-Ozekinci, Oakville (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 76 days.

(21) Appl. No.: 16/672,288

(22) Filed: Nov. 1, 2019

(65) Prior Publication Data
US 2021/0133043 A1 May 6, 2021

(51) Int. Cl.
*G06F 12/00* (2006.01)
*G06F 11/14* (2006.01)
*G06F 11/20* (2006.01)

(52) U.S. Cl.
CPC ...... *G06F 11/1464* (2013.01); *G06F 11/1451* (2013.01); *G06F 11/1461* (2013.01);
(Continued)

(58) Field of Classification Search
CPC ............. G06F 11/1461; G06F 11/1469; G06F 11/1466; G06F 11/1451; G06F 11/1464; G06F 11/1446; G06F 11/1448; G06F 11/1453; G06F 11/1456; G06F 11/1458; G06F 11/1471; G06F 11/2053; G06F 11/2094; G06F 11/2092; G06F 11/2089; G06F 11/2087; G06F 11/2084; G06F 11/2082; G06F 11/2079; G06F 11/2076; G06F 11/2074; G06F 11/2071; G06F 11/2069; G06F 11/2056; G06F 11/2058;
(Continued)

(56) References Cited

U.S. PATENT DOCUMENTS 6,745,210 B1  6/2004 Scanlan et al.
8,554,918 B1  10/2013 Douglis
(Continued)

*Primary Examiner* — Arvind Talukdar
(74) *Attorney, Agent, or Firm* — Chamberlain, Hrdlicka, White, Williams & Aughtry

(57) ABSTRACT

A manager for providing services to clients includes persistent storage and an orchestration manager. The persistent storage includes protection policies. The orchestration manager obtains a backup from a client of the clients based on a protection policy of the protection policies; makes a determination that an application catalog associated with the client is not stored in backup storages; in response to making the determination: obtains the application catalog from the client; stores the application catalog in the backup storages; and stores the obtained backup in the backup storages.

17 Claims, 12 Drawing Sheets

(52) U.S. Cl.
CPC ...... *G06F 11/1471* (2013.01); *G06F 11/2056* (2013.01); *G06F 11/2084* (2013.01); *G06F 11/1446* (2013.01)

(58) Field of Classification Search
CPC ............. G06F 11/2064; G06F 11/2061; G06F 11/2066
See application file for complete search history.

(56) References Cited

U.S. PATENT DOCUMENTS

| | | | |
|---|---|---|---|
| 9,798,629 B1 | 10/2017 | Shilane et al. | |
| 9,977,704 B1 | 5/2018 | Chopra et al. | |
| 10,089,144 B1 | 10/2018 | Nagpal et al. | |
| 10,102,080 B1 | 10/2018 | Gruszka et al. | |
| 10,616,127 B1 * | 4/2020 | Suit | G06F 9/5088 |
| 2007/0136541 A1 | 6/2007 | Herz et al. | |
| 2009/0271485 A1 | 10/2009 | Sawyer | |
| 2013/0085995 A1 | 4/2013 | Mostachetti et al. | |
| 2014/0279912 A1 | 9/2014 | Anglin | |
| 2014/0279922 A1 | 9/2014 | Kottomtharayil | |
| 2015/0096011 A1 * | 4/2015 | Watt | H04L 63/0272 726/15 |
| 2016/0217384 A1 | 7/2016 | Leonard et al. | |
| 2016/0306564 A1 | 10/2016 | Cheng et al. | |
| 2016/0342403 A1 * | 11/2016 | Zamir | G06F 8/61 |
| 2017/0010941 A1 | 1/2017 | Shimada | |
| 2017/0075765 A1 | 3/2017 | Chen | |
| 2017/0132089 A1 | 5/2017 | Roehrsheim et al. | |
| 2017/0300505 A1 | 10/2017 | Belmanu Sadananda et al. | |
| 2017/0357550 A1 | 12/2017 | Jain | |
| 2017/0364415 A1 | 12/2017 | Formato et al. | |
| 2018/0095816 A1 | 4/2018 | Fang et al. | |
| 2018/0314457 A1 | 11/2018 | Bender et al. | |
| 2019/0278661 A1 | 9/2019 | Mehta et al. | |
| 2019/0278663 A1 | 9/2019 | Mehta et al. | |
| 2020/0019319 A1 | 1/2020 | Cheng et al. | |
| 2020/0019470 A1 | 1/2020 | Wolfson et al. | |
| 2020/0264919 A1 * | 8/2020 | Vukovic | G06F 9/5044 |
| 2020/0334199 A1 | 10/2020 | Wolfson et al. | |
| 2020/0364112 A1 | 11/2020 | Mehta et al. | |
| 2020/0387321 A1 | 12/2020 | Bansal et al. | |

* cited by examiner

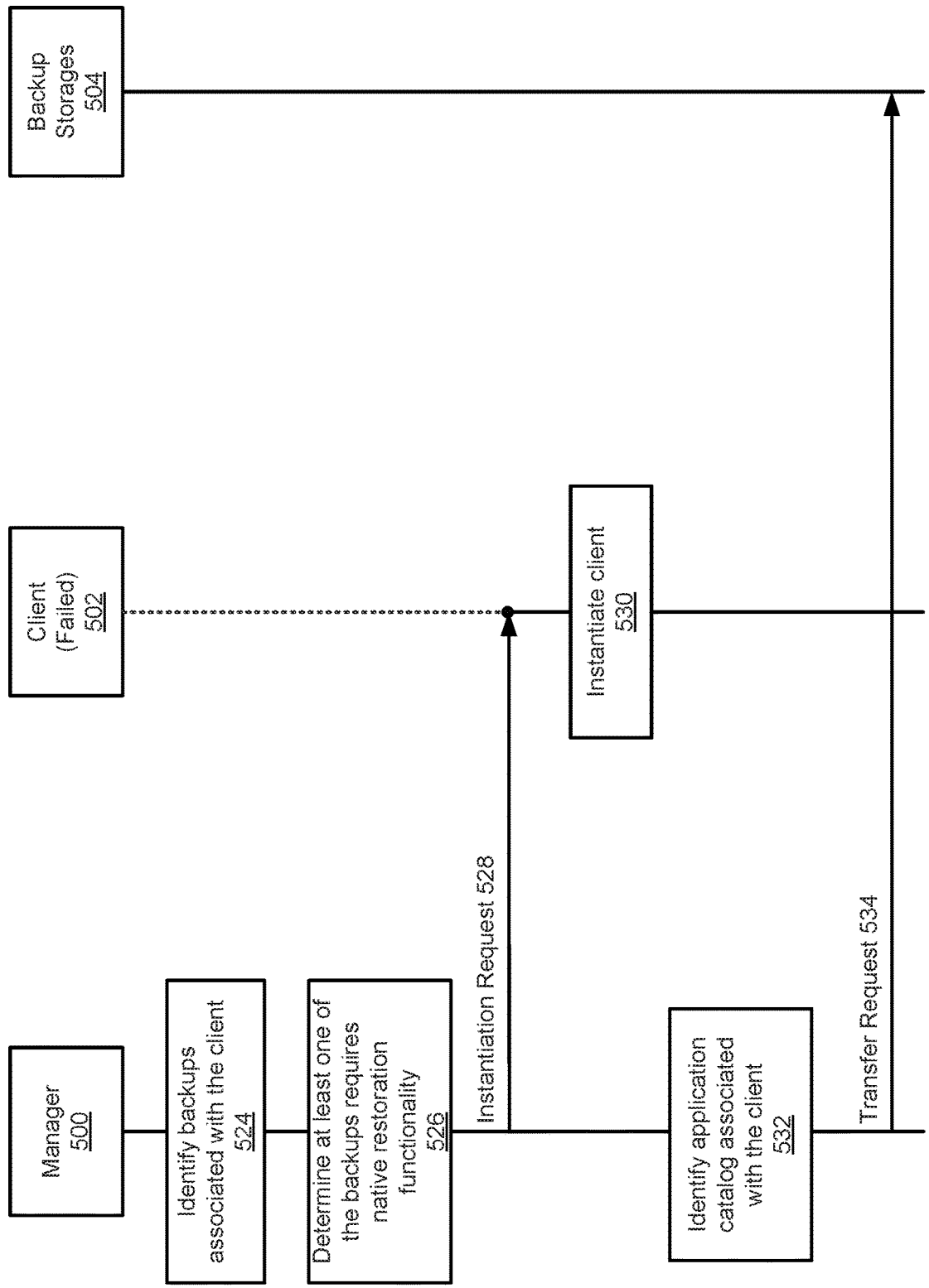

SYSTEM AND METHOD FOR RESILIENT DATA PROTECTION

BACKGROUND

Devices may generate information based on existing information. For example, devices may obtain information and derive information based on the obtained information. To obtain information, devices may be able to communicate with other devices. The communications between the devices may be through any means.

SUMMARY

In one aspect, a manager for providing services to clients in accordance with one or more embodiments of the invention includes persistent storage and an orchestration manager. The persistent storage includes protection policies. The orchestration manager obtains a backup from a client of the clients based on a protection policy of the protection policies; makes a determination that an application catalog associated with the client is not stored in backup storages; in response to making the determination: obtains the application catalog from the client; stores the application catalog in the backup storages; and stores the obtained backup in the backup storages.

In one aspect, a method for operating a manager for providing services to clients in accordance with one or more embodiments of the invention includes obtaining a backup from a client of clients based on a protection policy of protection policies; making a determination that an application catalog associated with the client is not stored in backup storages; in response to making the determination: obtaining the application catalog from the client; storing the application catalog in the backup storages; and storing the obtained backup in the backup storages.

In one aspect, a non-transitory computer readable medium in accordance with one or more embodiments of the invention includes computer readable program code, which when executed by a computer processor enables the computer processor to perform a method for operating a manager for providing services to clients. The method includes obtaining a backup from a client of clients based on a protection policy of protection policies; making a determination that an application catalog associated with the client is not stored in backup storages; in response to making the determination: obtaining the application catalog from the client; storing the application catalog in the backup storages; and storing the obtained backup in the backup storages.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 5A-5D show an example in accordance with one or more embodiments of the invention.

DETAILED DESCRIPTION

Figure 1:
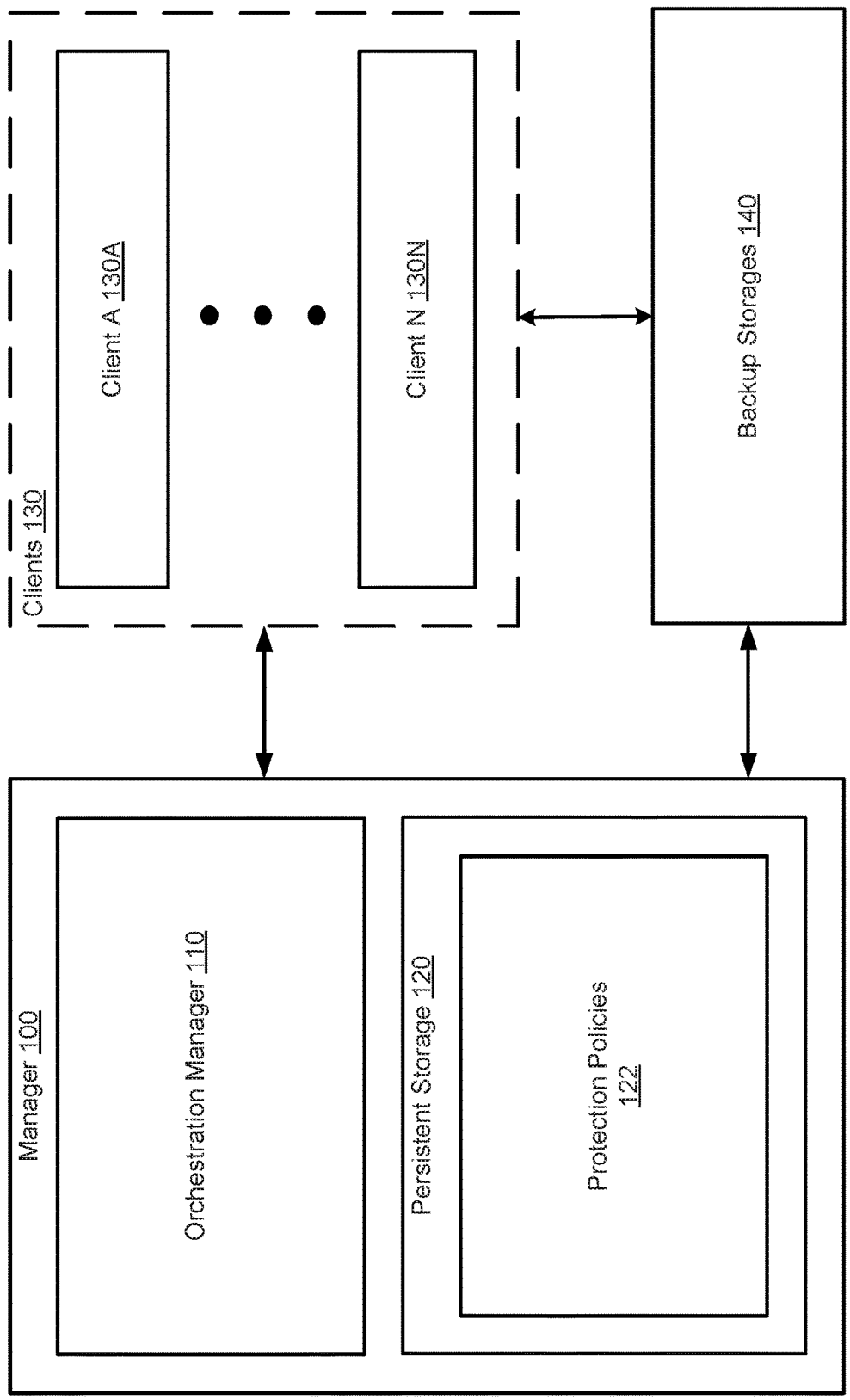
FIG. 1 shows a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for enabling entities to be restored. Specifically, a system in accordance with one or more embodiments of the invention may store backups and application catalogs in backup storages that may be used to restore the state of an entity (e.g., a client) to a previous state. By doing so, the operation of the entity may be restored when, for example, the entity fails. Entities may be restored for other purposes without departing from the invention.

To restore a client, one or more backups associated with the client may be utilized. The one or more backups may include backups of specific types. One of the specific types of backups may include a backup that is generated using functionality of an application hosted by the client (e.g., an application specific backup). To use such backups to perform restorations, the type of backup may need to be known and/or other types of information regarding the backup and/or an application that generated the backup may need to be known. The aforementioned information may not be included in the backups generated by the application. Rather, such information may be included in other types of backups, such as full backups, that reflect all of the data of an entity rather than a portion of the client data associated with a client. Thus, the use of backups generated by applications may be dependent on having access or otherwise being able to utilize other types of backups in combination with the backups generated by the applications.

Embodiments of the invention may provide a method for improving the likelihood that the information that enables the backups generated by applications to be used for restoration purposes will be available in the future. Specifically, embodiments of the invention may provide a system that generates an application catalog for an entity that includes the aforementioned information and may store the application catalog in backup storage for future use. By doing so, application generated backups may be usable in isolation (e.g., independently from information included in other backups). Consequently, a system in accordance with embodiments of the invention may be more likely to be able to restore a client to a desired point in time by eliminating the dependency of application generated backups on other types of backups for use in restorations.

FIG. 1 shows an example system in accordance with one or more embodiments of the invention. The example system may include a manager (100) and clients (130). The manager may provide backup and restoration services to the clients (130). The backup services may include generating backups and application catalogs for the clients (130). The backup services may also including storing the backups and application catalogs in backup storages (140) for future use.

The restoration services may include restoring the states of the clients (130) to previous operating states using the backups and/or application catalogs stored in the backup storages.

The backup storages (140) provide data storage services to the clients (130). The data storage services may include storing of data (e.g., backups, application catalogs, etc.) providing copies of previous stored data such as, for example, backups and application catalogs. The data stored in backup storages (140) may be used for purposes other than performing restorations without departing from the invention.

The clients (130) may provide services to other entities. When providing services to other entities, the clients (130) may generate and store data. For example, the clients (130) may include persistent storage in which the data is stored.

The clients (130) may be subject to failure. For example, any of the clients (130) may fail due to hardware failure, software failure, and/or any other computer related failure without departing from the invention. The failure may result in data loss, data corruption, and/or otherwise render the data stored by the clients in persistent storage to become inaccessible.

The manager (100) may provide restoration services to the client (130). By doing so, access to data that was lost, corrupted, or otherwise rendered inaccessible may be restored.

The components of the system illustrated in FIG. 1 may be operably connected to each other and/or operably connected to other entities (not shown) via any combination of wired and/or wireless networks. Each component of the system illustrated in FIG. 1 is discussed below.

The manager (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 4A-4D. The manager (100) may be implemented using other types of computing devices without departing from the invention. For additional details regarding computing devices, refer to FIG. 6.

The manager (100) may be implemented using logical devices without departing from the invention. For example, the manager (100) may include virtual machines that utilize computing resources of any number of physical computing devices to provide the functionality of the manager (100). The manager (100) may be implemented using other types of logical devices without departing from the invention.

In one or more embodiments of the invention, the manager (100) provides backup services and/or restoration services to the clients (130). The backup services may include (i) generating of backups of the clients, (ii) generating of application catalogs for the clients, and (iii) storing the generated backups and application catalogs in backup storage. The restoration services may include (i) obtaining one or more previously stored backups of the clients (130), (ii) obtaining one or more previously stored application catalogs associated with clients (130), and/or (iii) restoring one or more of the clients (130) using the obtained backups and/or application catalogs. The manager (100) may provide other and/or additional services to the clients (130) and/or other entities without departing from the invention.

To provide the above noted functionality of the manager (100), the manager (100) may include an orchestration manager (110) and persistent storage (120).

The orchestration manager (110) may provide the backup and restoration services, as discussed above, and/or includes functionality to send messages to entities (e.g., the clients (130) and/or backup agents (210, FIG. 2) hosted by the clients (130)) to invoke functionality of the clients (130). For example, a backup agent (e.g., 210, FIG. 2) hosted by a client (e.g., 130A, 130N) may service requests from the orchestration manager (110). The backup agent (e.g., 210, FIG. 2) may, upon receipt of such requests, invoke functionality of the client and/or its own functionality to service the requests from the orchestration manager (110).

The orchestration manager (110) may be implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the orchestration manager (110) described throughout this application and/or all or a portion of the methods illustrated in FIGS. 4A-4D. The orchestration manager (110) may be some other physical device without departing from the invention.

The orchestration manager (110) may be implemented using computer instructions (e.g., computing code) stored on a persistent storage (e.g., 120) that when executed by a processor of the manager (100) causes the manager (100) to perform the functionality of the orchestration manager (110) described throughout this application and/or all or a portion of the methods illustrated in FIGS. 4A-4D.

The orchestration manager (110) may utilize data structures stored in the persistent storage (120) of the manager (100). The persistent storage (120) may be implemented using one or more physical storage devices and/or a logical storage devices.

A physical storage device may be a hard disk drives, solid state disk drives, tape drives, and/or any other physical storage mediums for the storage of data.

The logical storage device (e.g., virtualized storage) may be a logical entity that utilizes any quantity of storage resources of any number of computing devices for storing data. For example, the logical storage device may utilize portions of storage resources provided by any combination of hard disk drives, solid state disk drives, tape drives, and/or any other physical storage medium of any number of computing devices. The logical storage device may be another type of logical storage without departing from the invention.

In one or more embodiments of the invention, the persistent storage (120) provides data storage services. The data storage services may include storing of data and providing of previously stored data. The persistent storage (120) may provide other and/or additional services without departing from the invention.

The persistent storage (120) may store data structures including protection policies (122). The protection policies (122) may be data structures that include information regarding requirements for providing backup services for any number of entities. The requirements may specify locations, types, and schedules for generation and storage of backups. There may be any number of protection policies (122) stored in the persistent storage (120). The protection policies (122) may be utilized by the orchestration manager (110) to determined when and how to generate and/or store backups (e.g., in one or more of the backup storages (140)).

In one or more embodiments of the invention, the protection policies (122) specify the types of backups to be generated. The backup types may include full, incremental, and application specific backups. A full backup may be a backup that includes data that may be used to restore the client to a predetermined point in time. An incremental backup may be a backup includes changes to client data made over a period of time. An incremental backup may be used in combination with a full backup to restore a client (e.g., the changes specified by the incremental backup may be used to modify the full backup to reflect the data of a client at a point in time that is different from the point in time associated with the full backup).

An application specific backup may be a backup that is generated by invoking the functionality of an application hosted by a client. As discussed above, information (e.g., backup use information) regarding how the generated backup may be used (e.g., a type of application that generated the backup, metadata regarding the contents of the application specific data, etc.) may be required to utilize application specific backup. The use information may be stored in another type of backup that may be utilized in combination with the application specific backup to perform a restoration.

For example, consider a scenario where a full backup of the client is generated and an application specific backup is generated. The full backup may be usable to restore the client, including the backup use information associated with an application that generated the application specific backup, to a previous state. After restoring the client, the application specific backup may be usable to modify the portion of the client's data corresponding to application data of the client to a second previous state. However, to utilize the application specific backup, the backup use information may need to be utilized in combination with the application specific backup. If the backup use information is unavailable due to, for example, data corruption, the application specific backup may not be able to be used to restore the state of the application. Consequently, even though the application specific backup exists, the application specific backup may be unusable for restoration purposes.

Embodiments of the invention may provide a method for using application specific backups in scenarios in which the backup use information for the application and/or the application specific backup included in a backup has been rendered unusable. To do so, a system in accordance with embodiments of the invention may store an application catalog for the client in backup storage. The application catalog may include backup use information for the application and/or application specific backup. By doing so, the information included in the application catalog may be used to render an otherwise unusable application specific backup to be usable for restoration purposes. Consequently, a distributed system in accordance with embodiments of the invention may be more likely to be able to continue the desirable operation of components of the system.

The clients (130) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 4A-4D. The clients (130) may be implemented using other types of computing devices without departing from the invention. For additional details regarding computing devices, refer to FIG. 6.

The clients (130) may be implemented using logical devices without departing from the invention. For example, the clients (130) may include virtual machines that utilize computing resources of any number of physical computing devices to provide the functionality of the clients (130). The clients (130) may be implemented using other types of logical devices without departing from the invention.

In one or more embodiments of the invention, the clients (130) provide computer implemented services. A computer implemented service may be, for example, managing a database, serving files, and/or providing other types of services that may be utilized by users. The computing implemented services may be other types of services without departing from the invention.

When providing computer implemented services, the clients (130) may generate and store data which the clients (130) utilize to provide the computer implemented services. For example, to provide database services, the clients (130) may store information from a user in a database. The user may desire access to the information in the future. Consequently, the future availability of the data stored in the database may be valuable to the clients (130).

Similarly, other entities may desire access to all, or a portion, of the data stored in the client (130) at future points in time. For example, other entities may desire to obtain access to information included in a database hosted by one or more of the clients (130).

To improve the likelihood that such data is available in the future, the clients (130) may utilize backup and/or restoration services provided by the manager (100). As discussed above, the backup and/or restoration services provided by the orchestration manager (110) which may include orchestration of backup generation, storage of backups in the backup storages (140), and/or providing access to backups and/or information included in the backups for restoration purposes.

When utilizing the backup and/or restoration services provided by the manager (100), the clients (130) may perform actions under the directions of the orchestration manager (110) of the manager (100). By doing so, the orchestration manager (110) may orchestrate the transmission of data and/or performance of actions between the clients (130), the manager (100), and/or the backup storages (140).

For example, a client (e.g., 130A) may send backups and application catalogs to the orchestration manager (110) of the manager (100) and/or the backup storages (140). The orchestration manager (110) and/or backup storages (140) may store the backups and/or application catalogs from clients (130) for future use when restoring the clients (130) to previous operating states. For additional information regarding the clients (130), refer to FIG. 2.

In one or more embodiments of the invention, the backup storages (140) are implemented using storage devices. The storage devices may include physical storage devices and/or logical storage devices. The backup storage (140) may be any number of storage devices in the backup storages (140). The backup storages (140) may be implemented using other types of devices that provide data storage services without departing from the invention.

A logical storage device may be an entity that utilizes the physical storage resources of one or more computing devices to provide data storage services. For example, a logical storage may be a virtualized storage that utilizes any quantity of storage resources (e.g., physical storage devices) of any number of computing devices.

A physical storage device may be a physical device that provides data storage services. For example, a physical storage device may include any number of physical devices such as, for example, hard disk drives, solid state drives, tape drives, and/or other types of hardware devices that store data. The physical storage device may include any number of other types of hardware devices for providing data storage services. For example, the physical storage device may include storage controllers that balance and/or allocate storage resources of hardware devices, load balancers that distribute storage workloads across any number of hardware devices, memory for providing cache services for the hardware devices, etc.

In one or more embodiments of the invention, the backup storages (140) provide data storage services to the clients (130) and/or other entities (e.g., the orchestration manager (110)). The data storage services may include storing data and providing of previously stored data. In one or more embodiments of the invention, the data stored by the backup storages (140) includes backups and application catalogs that may be used for restoration (and/or other) purposes. The backup storages (140) may provide other and/or additional services to other and/or additional entities without departing from the invention. For additional information regarding the backup storages (140), refer to FIG. 3.

While the system of FIG. 1 has been described and illustrated as including a limited number of specific components for the sake of brevity, a system in accordance with embodiments of the invention may include additional, fewer, and/or different components from those illustrated in FIG. 1 without departing from the invention.

Figure 2:
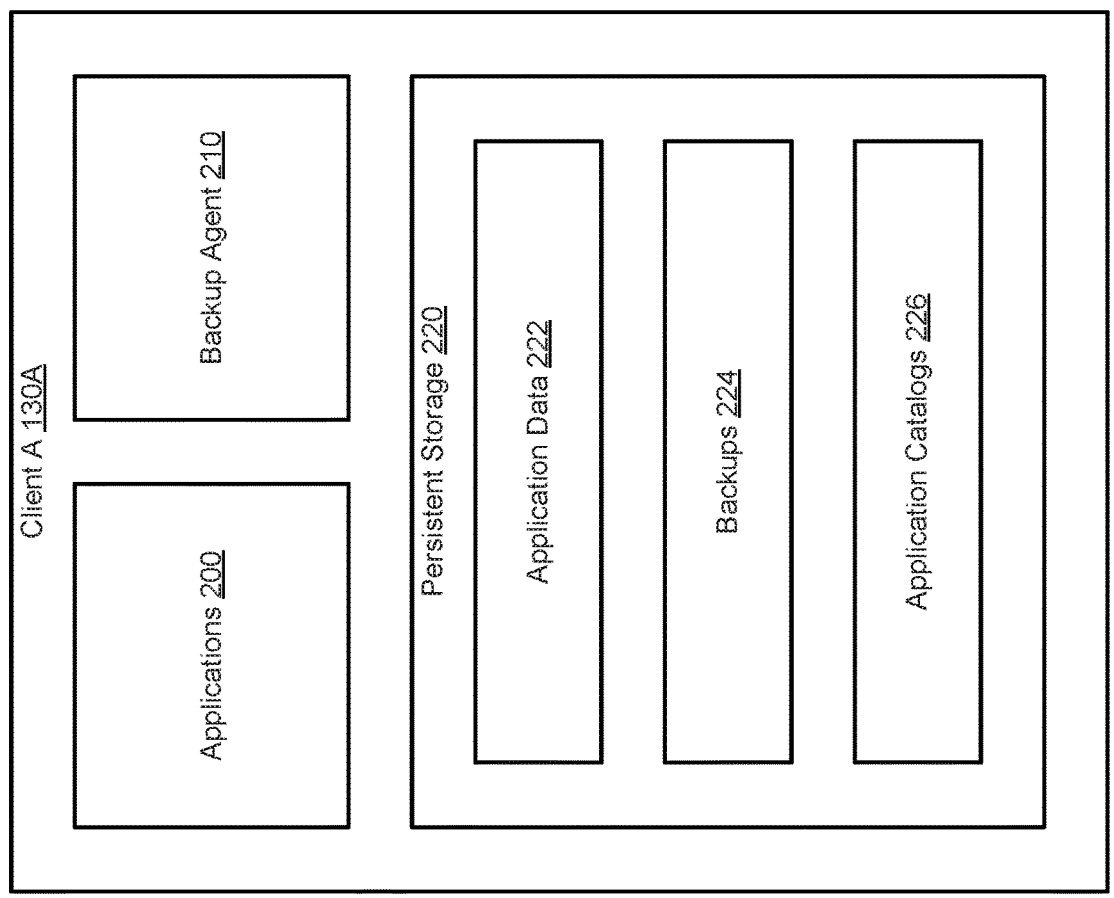
FIG. 2 shows a diagram of a client in accordance with one or more embodiments of the invention.

As discussed above, the clients (130) may utilize backup and/or restoration services provided by the system of FIG. 1. FIG. 2 shows a diagram of a client (130A) of the clients (130, FIG. 1) in accordance with one or more embodiments of the invention. Any of the clients (130, FIG. 1) may be similar to the client (130A). As discussed above, the client (130A) may provide computer implemented services to any number of entities and may utilize backup and/or restoration services provided by the manager (100, FIG. 1).

To provide its functionality, the client A (130A) may include applications (200), a backup agent (210), and persistent storage (220). Each component of the client A (130A) is discussed below.

The applications (200) may provide computer implemented services. When providing computer implemented services, the applications (200) may generate application data (222) stored in persistent storage (220). When the computer implemented services are provided by the applications (200), information that may be relevant for future use may be stored in the application data (222).

For example, an application of the applications (200) may be a database application. A user of the client A (130A) may enter information into a database stored as part of the application data (222) when utilizing the computer implemented services provided by the database application. By doing so, the information included in the application data (222) may be of importance to the user for future use. Consequently, the user may desire to access the information at future points in time. However, the information may be inaccessible if for any reason the application data (222) stored in the persistent storage (220) becomes inaccessible.

To address this and other potential issues, the client A (130A) may include the backup agent (210). The backup agent (210) may cooperate with the manager (100, FIG. 1) to provide data backup and/or restoration services for the application data (222) and/or other data hosted by the client A (130A). The backup agent (210) may provide data protection services for the client (130A) under the direction of the orchestration manager (110, FIG. 1).

For example, the orchestration manager (110, FIG. 1) may initiate backup generation, application catalog generation, storage of the backup and/or the application catalog, and/or restoration of the client using previously generated backups and/or application catalogs. By doing so, the orchestration manager (110, FIG. 1) may orchestrate the generation and/or storage of backups and application catalogs in backup storages (140, FIG. 1). Consequently, data that may be used to restore the application data (222) and/or other data of the client A (130A) may be maintained in the backup storages (140, FIG. 1).

To provide all, or a portion of the noted functionality of the backup agent (210), the backup agent (210) may perform all, or a portion, of the methods illustrated in FIGS. 4A-4D.

The applications (200) and/or the backup agent (210) may be implemented using physical and/or logical devices. A physical device may be, for example, an application specific integrated circuit, a field programmable gate array, or any other type of hardware device that includes circuitry adapted to provide the functionality of the applications (200) and/or the backup agent (210). A logical device may be, for example, computer instructions stored in persistent storage that when executed by a processor provides the functionality of the applications (200) and/or the backup agent (210).

In one or more embodiments of the invention, the persistent storage (220) provides data storage services to the applications (200), the backup agent (210), and/or other entities. The data storage services may include storing of data and providing of previous stored data. The persistent storage (220) may implemented using one or more physical storage devices and/or logical storage devices.

A physical storage device may be hard disk drives, solid state disk drives, tape drives, and/or any other physical storage mediums for the storage of data.

The logical storage device (e.g., virtualized storage) may be a logical entity that utilizes any quantity of storage resources of any number of computing devices for storing data. For example, the logical storage device may utilize portions of storage resources provided by any combination of hard disk drives, solid state disk drives, tape drives, and/or any other physical storage medium of any number of computing devices. The logical storage device may be another type of logical storage without departing from the invention.

The persistent storage (220) may store data structures including the application data (222), backups (224), application catalogs (226) and/or other data. Each of these data structures is discussed below.

As noted above, the application data (222) may be one or more data structures that include data generated, maintained by, and/or utilized by the applications (200) of clients (e.g., 130A). The application data (222) may include any quantity and/or type of data.

The backups (224) may be data structures that include information that may be used to restore data of the client (130A). The backups (224) may include any type of backups (e.g., full backups, incremental backups, application specific backups, etc.).

Application catalogs (226) may be data structures that include information regarding applications and/or application specific backups that are generated, stored, and utilized by the client A (130A) for restoration purposes. Application catalogs (226) may be generated and maintained by the backup agent (210) of the client (130A) and stored in backup storages (140, FIG. 1) by the manager (100, FIG. 1). An application catalog of the application catalogs (226) may be associated with the client (130A) and a backup when the application catalog and the backup are stored in the backup storages (140, FIG. 1). Application catalogs (226) may be utilized by the backup agent (210) of the client (130A) to invoke the restoration functionality of applications hosted by the client (130A) when restoring the client (130A) using an application specific backup.

As discussed above, the application catalogs (226) may include information regarding application specific backups. This information may include a description of application specific backups. The description may include information regarding the type of backup, the backup size, the backup storage location, the application type used to generate the backup and/or any other information that could be used to describe the application specific backups. The application catalogs (226) may also include an identifier of the application of applications (200) that generated the application specific backup. This identifier may be, for example, an application name, an application number, or any other identifier that specifies the application used to generate the backup. The application catalogs (226) may also include identifiers of points in time associated with the application specific backups. The identifiers may include, for example, a timestamp that indicates the point in time the backup was generated and/or any other information that specifies a point in time associated with the backup. By doing so, changes to the application data included in the application specific backups may be delineated from other changes (e.g., that occurred after the point in time) to the application data (222).

While the client A (130A) of FIG. 2 has been described and illustrated as including a limited number of specific components for the sake of brevity, a client (130A) in accordance with embodiments of the invention may include additional, fewer, and/or different components than those illustrated in FIG. 2 without departing from the invention.

Figure 3:
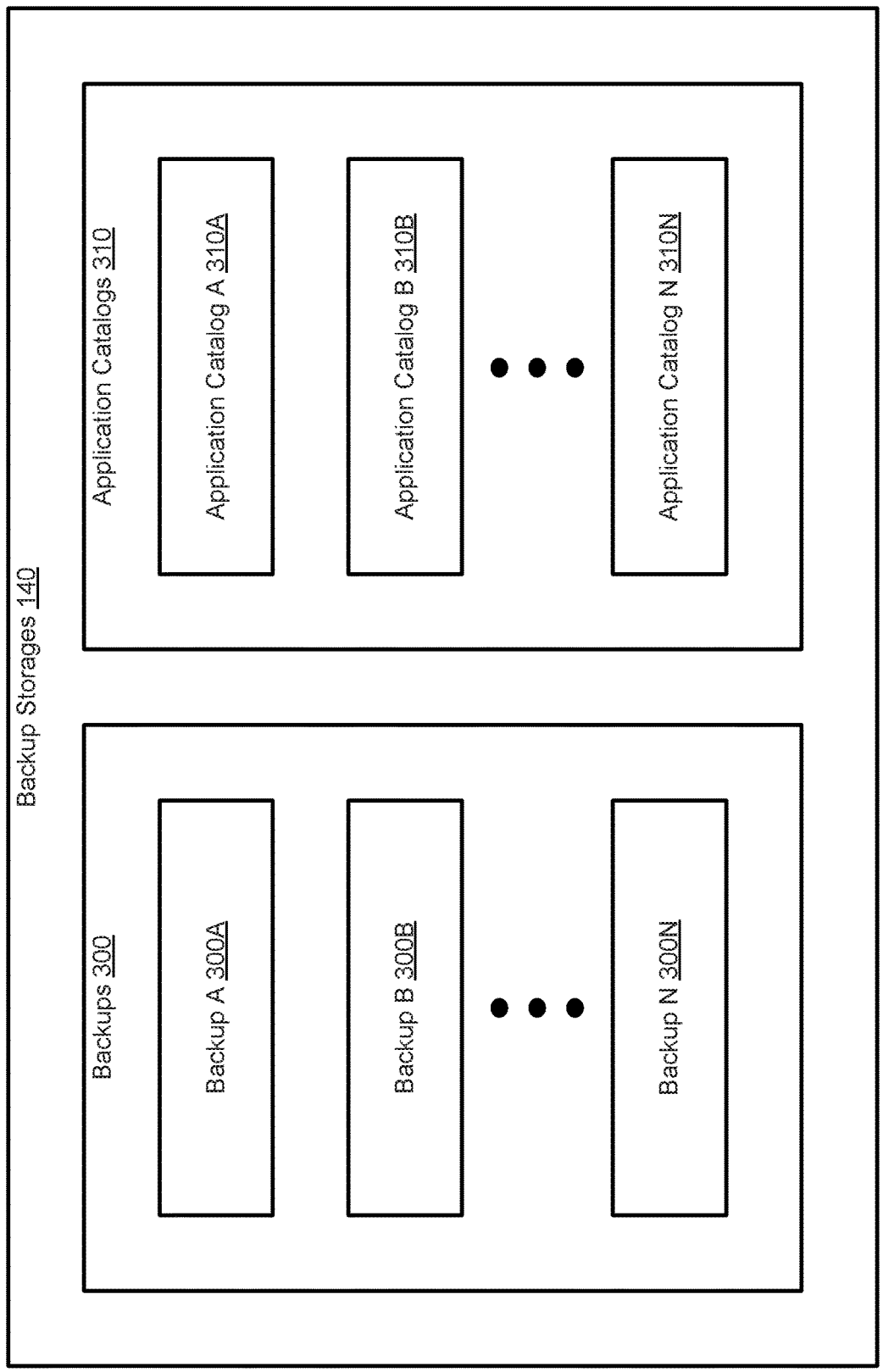
FIG. 3 shows a diagram of backup storages in accordance with one or more embodiments of the invention.

As discussed above, the orchestration manager (110, FIG. 1) may orchestrate storage of backups and application catalogs in backup storages (140). FIG. 3 shows a diagram of the data that may be stored in backup storages (140, FIG. 1) in accordance with one or more embodiments of the invention.

As discussed above, the backup storages (140) may store backups (300). The backups (300) may be include any number and type of backups including, for example, application specific backups or non-application specific backups (e.g., full/incremental backups). The backups (300) may be utilized for restoration purposes.

Each backup (e.g., 300A, 300B, 300N) may be associated with corresponding clients, corresponding applications (200, FIG. 2) hosted by the client, and/or respective points in time.

The backup storages (140) may also store application catalogs (310). The application catalogs (310) may be used for restoration purposes. For example, the application catalogs (e.g., 310A, 310B, 310N) may be used to enable application specific backups that are otherwise unusable to be usable.

While the backup storages (140) of FIG. 3 have been described and illustrated as including a limited amount of specific information stored in a particular manner, the backup storages (140) may store additional, less, and/or different information and/or in different formats without departing from the invention.

As discussed above, a manager in accordance with embodiments of the invention may provide backup and/or restoration services. FIGS. 4A-4D show methods that may be performed by the manager (100, FIG. 1) when providing the aforementioned services.

Figure 4A:
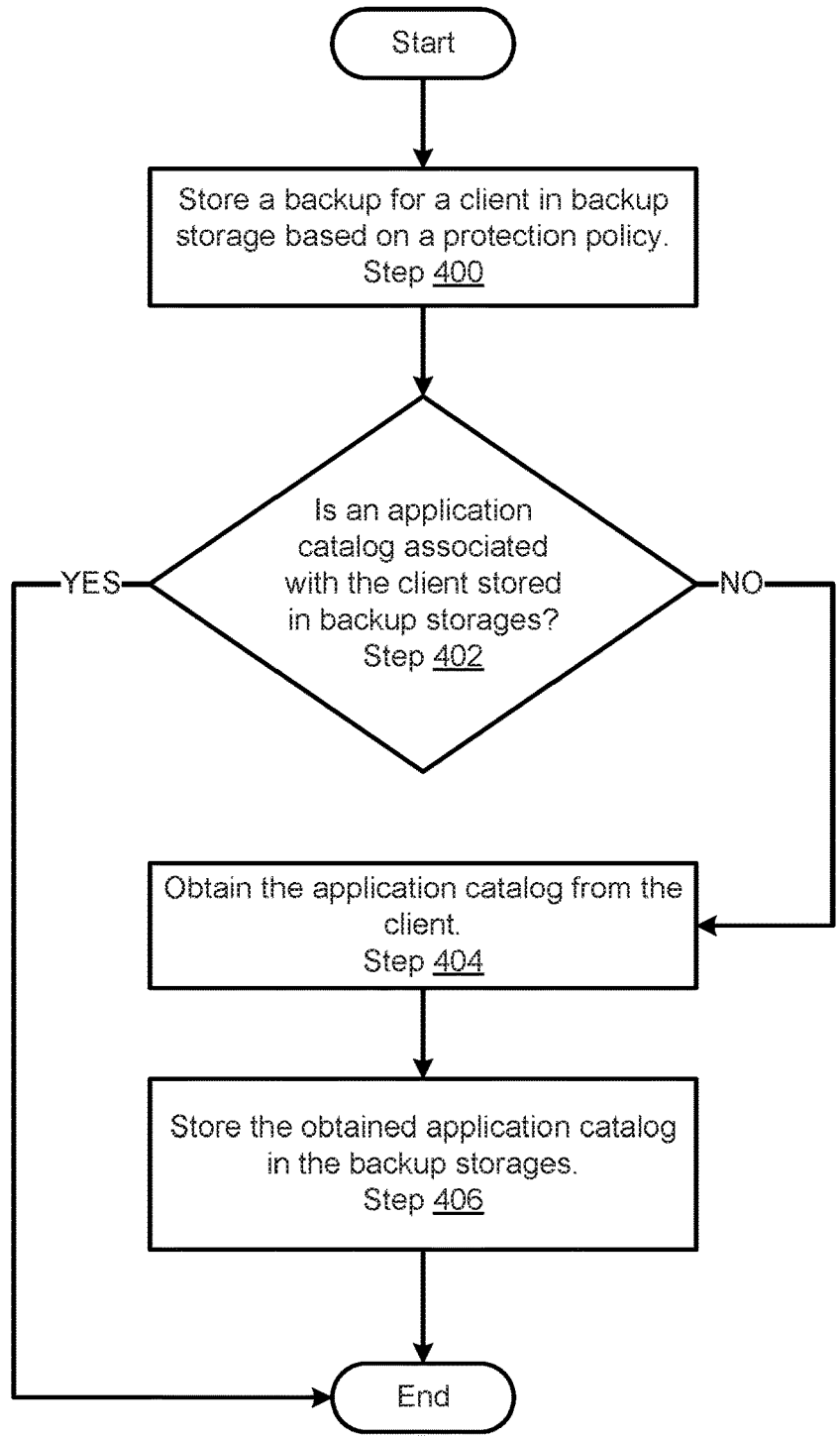
FIG. 4A shows a flowchart of a method in accordance with one or more embodiments of the invention.

FIG. 4A shows a flowchart of a method in accordance with one or more embodiments of the invention. The method depicted in FIG. 4A may be used to provide restoration services to the clients. The method depicted in FIG. 4A may be performed by, for example, the manager (100, FIG. 1). Other components of the system illustrated in FIG. 1 may perform all, or a portion, of the method of FIG. 4A without departing from the invention.

While FIG. 4A is illustrated as a series of steps, any of the steps may be omitted, performed in a different order, additional steps may be included, and/or any or all of the steps may be performed in a parallel and/or partially overlapping manner without departing from the invention.

In step 400, a backup of a client is stored in backup storage based on a protection policy.

In one or more embodiments of the invention, the backup is stored by sending a request to an agent hosted by a client to generate and store the backup in backup storage. The backup may be, for example, an application specific backup.

Upon receipt of the request, the agent may invoke native backup functionality of an application to generate the backup. Once generated, the agent may send a copy of the backup to backup storage for storage.

In step 402, it is determined whether an application catalog associated with the client is stored in backup storages.

The determination may be made by sending a request to backup storage. The request may ask the backup storage to determine whether an application catalog for the client is stored in backup storage. The backup storage may send a response to the request that indicates whether the application catalog is stored in backup storage.

If it is determined that the application catalog is stored in the backup storage, the method may end following step 402. If it is determined that the application is not stored in the backup storage, the method may proceed to step 404.

In step 404, an application catalog is obtained from the client.

In one or more embodiments of the invention, the application catalog is obtained by sending a message to an agent hosted by the client requesting an application catalog. In response to the request, the agent may characterize one or more of the applications hosted by the client. The characterization may include identifying an application type of the application, the metadata required to utilize backups generated by the applications and/or other types of information. The information obtained regarding the applications via the characterization may be stored as the application catalog. The generated application catalog may be provided in response to the request.

The application catalog may also include information with respect to how to utilize the backup stored in the backup storage. For example, metadata with respect to the creation data of the backup, the application that created the backup, and/or other information that may be used to invoke the restoration functionality of the application that generated the backup may be added to the application catalog prior to being provided.

In step 406, the obtained application catalog is stored in the backup storages.

The application catalog may be stored in the backup storages by sending a copy of the application catalog to the backup storages. Once provided to the backup storages, the backup storages may store the application catalog and/or associate the stored application catalog with the backup. Such associations may be used when performing restorations to identify appropriate application catalogs that may be used to enable restorations using the backup (e.g., an application specific backup) to be performed.

The method may end following step 406.

Figure 4B:
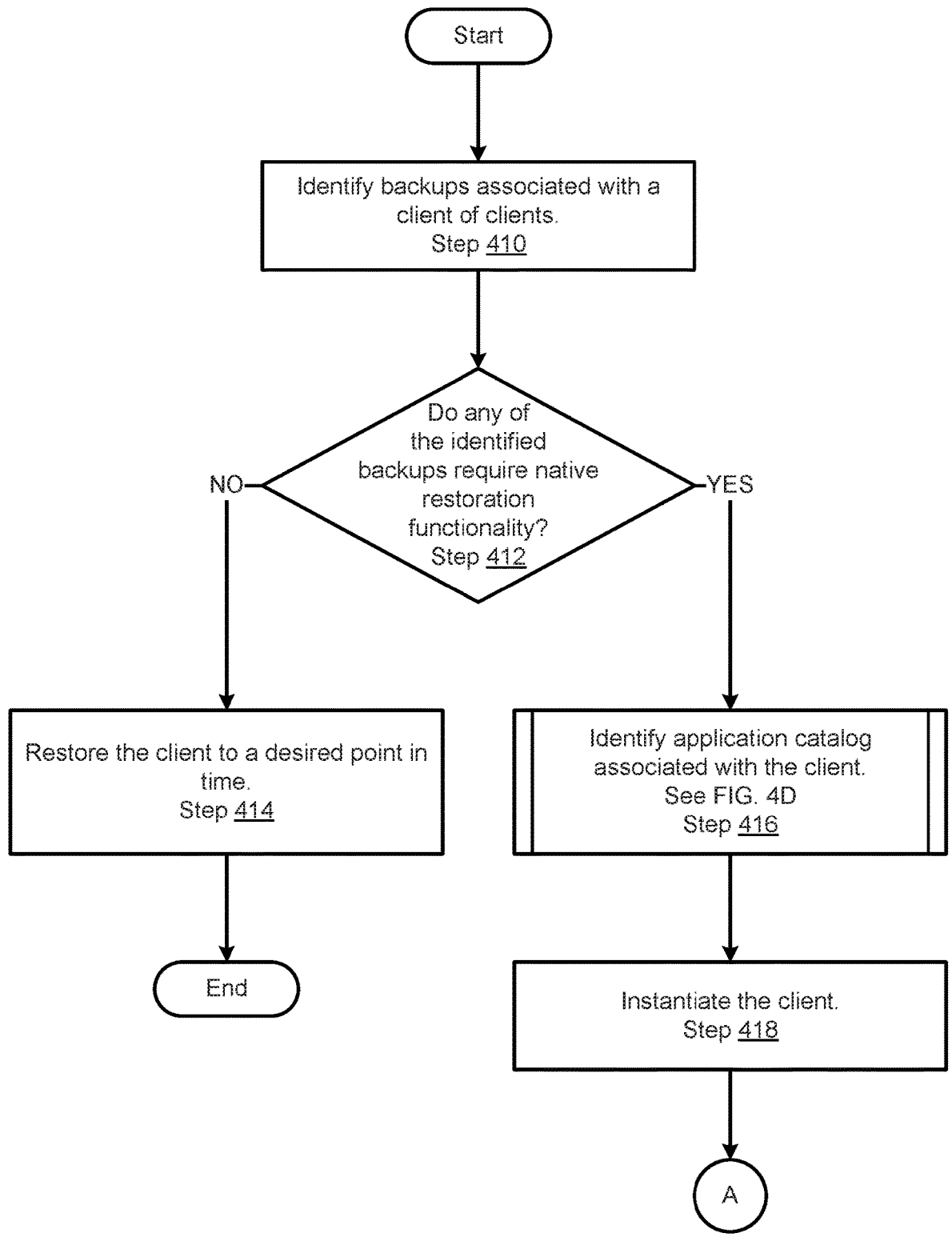
FIG. 4B shows a flowchart of a method in accordance with one or more embodiments of the invention.

As discussed above, stored backups may be used to restore a client. FIG. 4B shows a flowchart of a method in accordance with one or more embodiments of the invention. The method depicted in FIG. 4B may be used to restore a client. The method shown in FIG. 4B may be performed by, for example, the manager (100, FIG. 1). Other components of the system illustrated in FIG. 1 may perform all, or a portion, of the method of FIG. 4B without departing from the invention.

While FIG. 4B is illustrated as a series of steps, any of the steps may be omitted, performed in a different order, additional steps may be included, and/or any or all of the steps may be performed in a parallel and/or partially overlapping manner without departing from the invention.

In step 410, backups associated with a client of clients are identified.

As discussed above, a client of the clients may fail. After failure, the manager may identify backups associated with the client in order to restore the failed client. The manager may access the backups stored in the backup storages by sending appropriate requests to the backup storages to identify backups associated with the client.

In step 412, it is determined whether any of the backups require restoration functionality of an application to be utilized. In other words, whether any of the identified backups are application specific backups.

If it is determined at least a backup of the backups requires native backup restoration functionality, the method may proceed to step 416. If it is determined that none of the backups require native backup restoration functionality, the method may proceed to step 414.

In step 414, the client is restored to a desired point in time. The client may be restored using one or more of the identified backups of step 410.

To restore the client to the desired point in time, the manager may send a message to the backup agent of the client requesting the backup agent to restore the client to the desired point in time. The backup agent of the client may obtain the identified backups from the backup storages. After obtaining the identified backups, the backup agent may then use the obtained backups to restore the client to a desired point in time without having to invoke the native restoration functionality of any applications. The client may be restored to a desired point in time via other and/or additional methods without departing from the invention.

The method may end following step 414.

Returning to step 412, the method may proceed to step 416 if any of the identified application require native restoration functionality of one or more applications hosted by the client.

In step 416, an application catalog associated with the client is identified. The application catalog associated with the client may be identified via the method illustrate din FIG. 4D.

In step 418, the client is instantiated.

In one or more embodiments of the invention, the manager sends a message to the backup agent or another entity hosted by the client that includes a request to instantiate the client. Upon receiving the message, the backup agent or another entity hosted by the client may instantiate the client. Instantiation of the client may result in the client entering a state, which may allow the client to be restored using backups and application catalogs. Instantiation may include allocating computing resources including storage resources for storing client data to the client. The client may be instantiated via other and/or additional methods without departing from the invention.

Figure 4C:
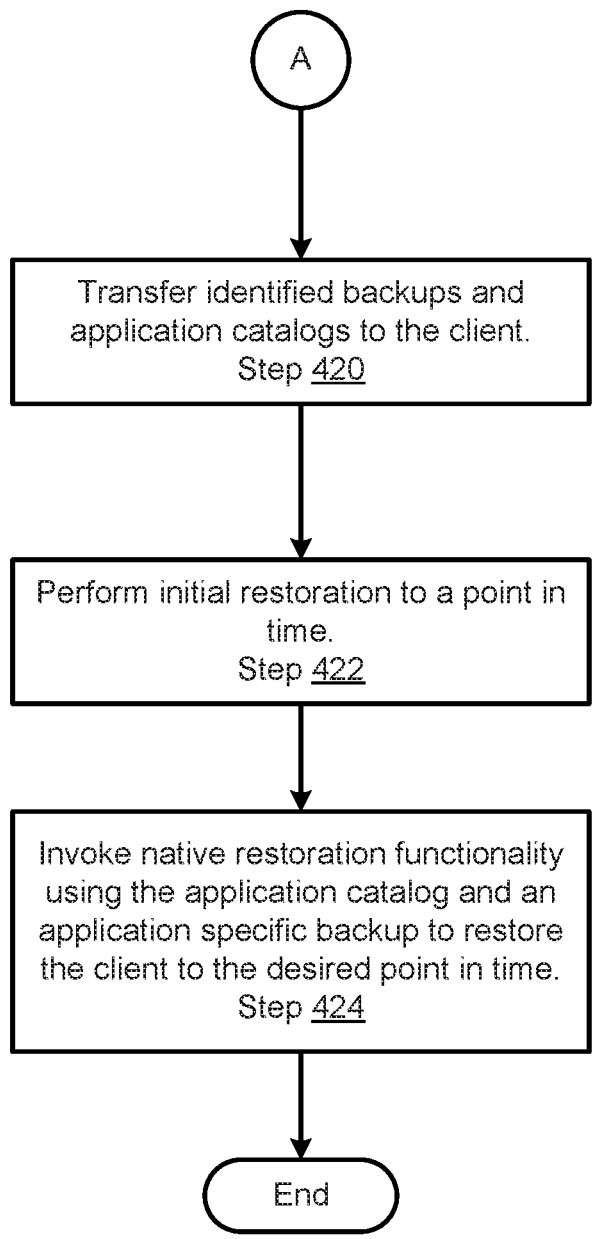
FIG. 4C shows a continuation of a flowchart of a method depicted in FIG. 4B in accordance with one or more embodiments of the invention.

The method may proceed to step 420 illustrated in FIG. 4C following step 418.

FIG. 4C shows a continuation of the flowchart of FIG. 4B.

In step 420, the identified backups and application catalog are transferred to the instantiated client.

In one or more embodiments of the invention, the manager sends a transfer request to the backup agent of the client to transfer the backups and application catalog to the instantiated client. The transfer request may include information regarding the backups and application catalog that enables the backup agent to obtain the backups and/or application catalog from backup storages. In response to the transfer request, the backup agent may access the backup storages and obtain the identified backups and application catalog. The identified backups and application catalog may be transferred to the client via other and/or additional methods without departing from the invention.

In one or more embodiments of the invention, the manager sends the backups and application catalog to the backup agent of the client. After sending the request to instantiate the client, the manager may access the backup storages and obtain the previously identified backups and application catalog associated with the failed client. The manager may then send the identified backups and application catalog to the backup agent of the instantiated client. The identified backups and application catalog may be transferred to the client via other and/or additional methods without departing from the invention.

In step 422, an initial restoration to a point in time is performed.

The manager may send a message to the backup agent of the client that includes a request to perform an initial restoration of the client to a point in time. In response to this message, the backup agent, or another entity hosted by the client, may use the non-application specific backups to restore the client to a point in time. For example, a full backup of the client such as an image of the client may be used to restore the client to a point in time associated with the image by copying the image to the storage resources of the instantiated client.

The point in time to which the client is initially restored may not be the desired point in time. For example, the state of application data may when restored via the initial restoration may be different from the desired state of the application data.

In step 424, the client is restored to a desired point in time using the application catalog to invoke native restoration functionality of an application using an application specific backup.

To restore the client to the desired point in time, the manager may send a message to the backup agent of the client that includes a request to restore the client to a desired point in time. In response to this message, the backup agent may utilize one or more application specific backups of the identified backups that require native restoration restoration functionality to restore the client to a desired point in time. The backup agent may utilize the application catalog to invoke the native restoration functionality of the application specific backups based on the information included in the application catalogs.

For example, the application catalog may specify an application that generated a backup of the backups. The backup agent may invoke the native restoration functionality of an instance of the application hosted by the instance of the client in order to utilize the application specific backup to restore application data associated with the instance of the application. By doing so, the application data may be restored to the desired point in time.

The method may end following step 424.

Figure 4D:
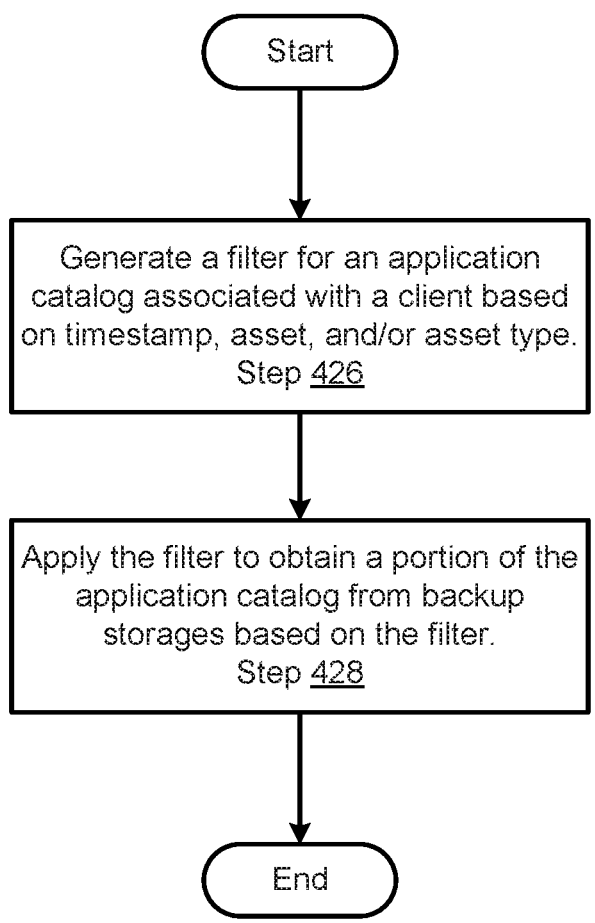
FIG. 4D shows a flowchart of a method in accordance with one or more embodiments of the invention.

As discussed above, the method illustrated in FIG. 4D may be utilized to identify application catalogs associated with a client that may be used for restoration purposes. FIG. 4D shows a flowchart of a method in accordance with one or more embodiments of the invention. The method depicted in FIG. 4D may be used to identify an application catalog associated with a client. The method shown in FIG. 4D may be performed by, for example, a manager (100, FIG. 1). Other components of the system illustrated in FIG. 1 may perform all, or a portion, of the method of FIG. 4D without departing from the invention.

In step 426, a filter for an application catalog associated with a client is generated based on timestamp, asset, and/or asset type.

In one or more embodiments of the invention, the manager generates a filter for an application catalog associated with a client based on specific criteria. After identifying the application catalog associated with the client, the manager may generate a filter that selects a portion of the application catalog based on backup timestamp, asset, and/or asset type. The backup timestamp may specify the time a backup associated with the client was generated and/or the time in which the client would be restored to if the backup was used to restore the client. The asset may specify the specific application of a client that generated the backup and/or the application for which may utilize a backup. The asset type may specify the type of application that may utilize a backup associated with the application catalog. The filter may include other and/or additional identification criteria without departing from the invention. A filter for an application catalog associated with a client may be generated via other and/or additional methods without departing from the invention.

In step 428, the filter is applied to obtain a portion of the application catalog from backup storages based on the filter.

The manager may access the backup storages to identify an application catalog associated with the client. The manager may apply the filter to an application catalog that is associated with the client in order to identify a portion of the application catalog that corresponds to the desired identification criteria of the filter. For example, the manager may apply the filter to an application catalog to identify a portion of the application catalog that includes a certain timestamp and application of applications of the client. After applying the filter, the manager may identify a portion of the application catalog associated with the client to be utilized during the restoration of the client to restore the client to a desired point in time. The filter may be applied to obtain a portion of the application catalog from backup storages based on the filter via other and/or additional methods without departing from the invention.

The method may end following step 428.

Thus, via the methods illustrated in FIG. 4A-4D, a system in accordance with embodiments of the invention may facilitate the use of application specific backups for restoration purposes in scenarios in which backup use information for the application specific backups has become unavailable due to, for example, data corruption. By doing so, embodiments of the invention may provide a system that is resistant to data corruption that may otherwise render the system unable to perform restorations.

Figure 5A:
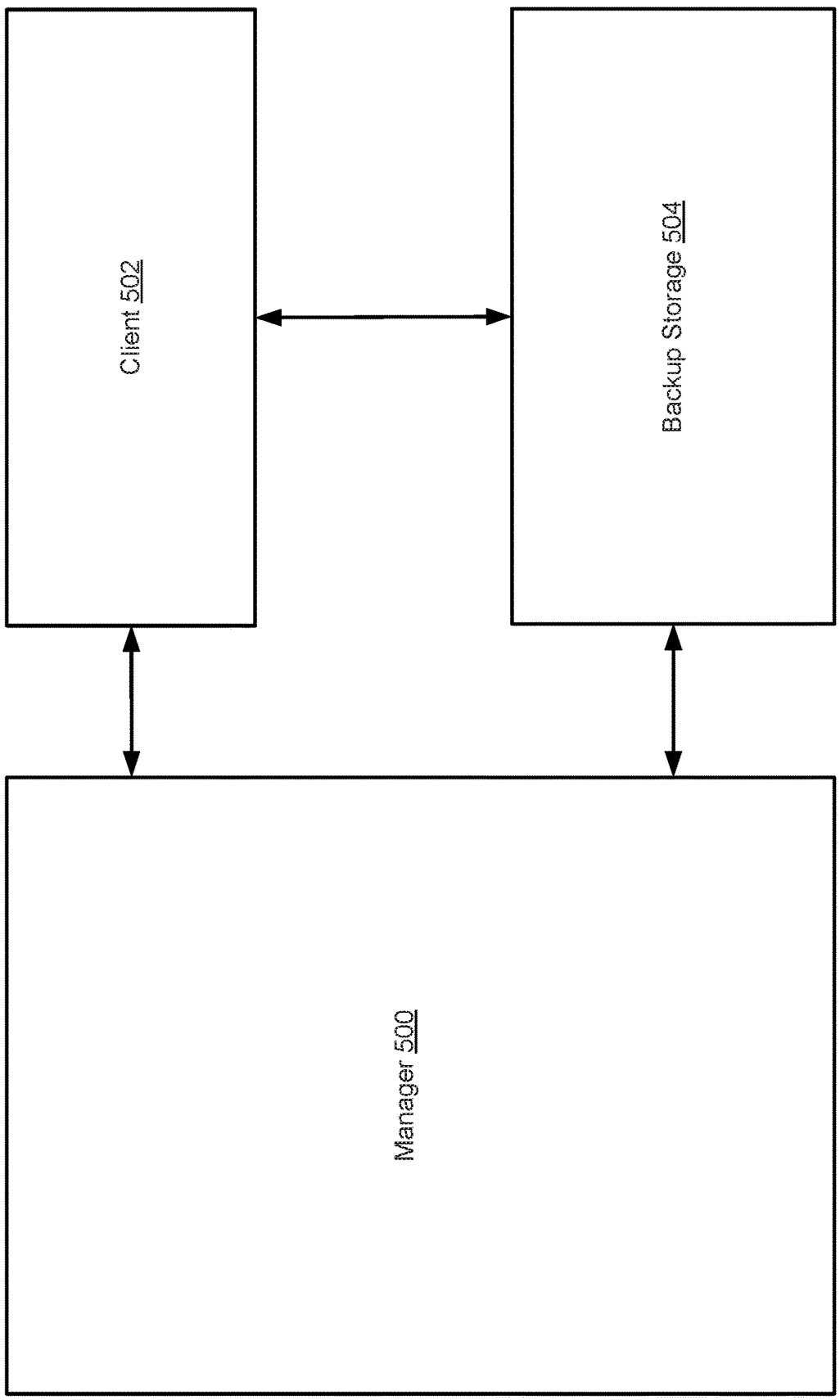
Figure 5B:
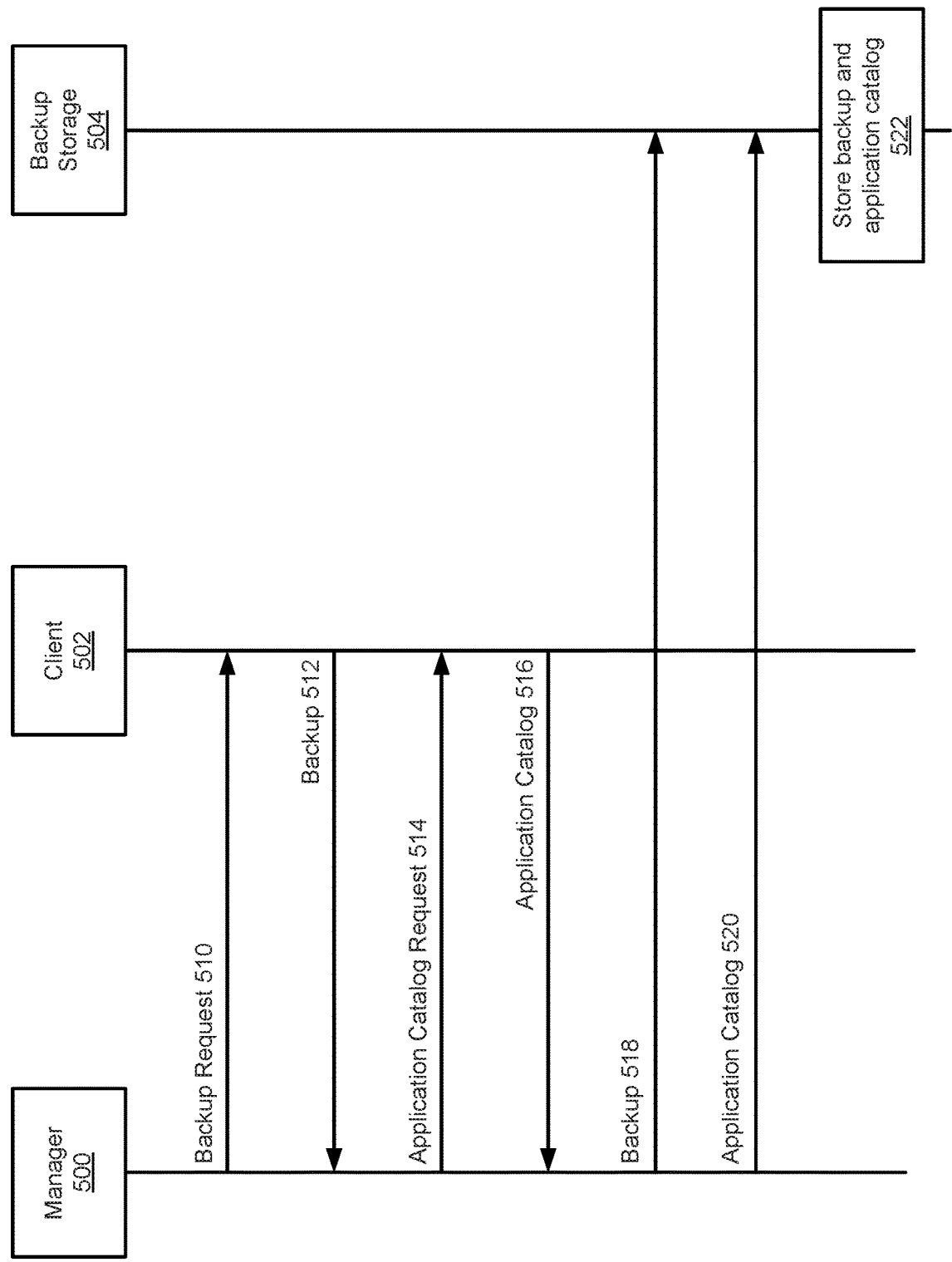
Figure 5D:
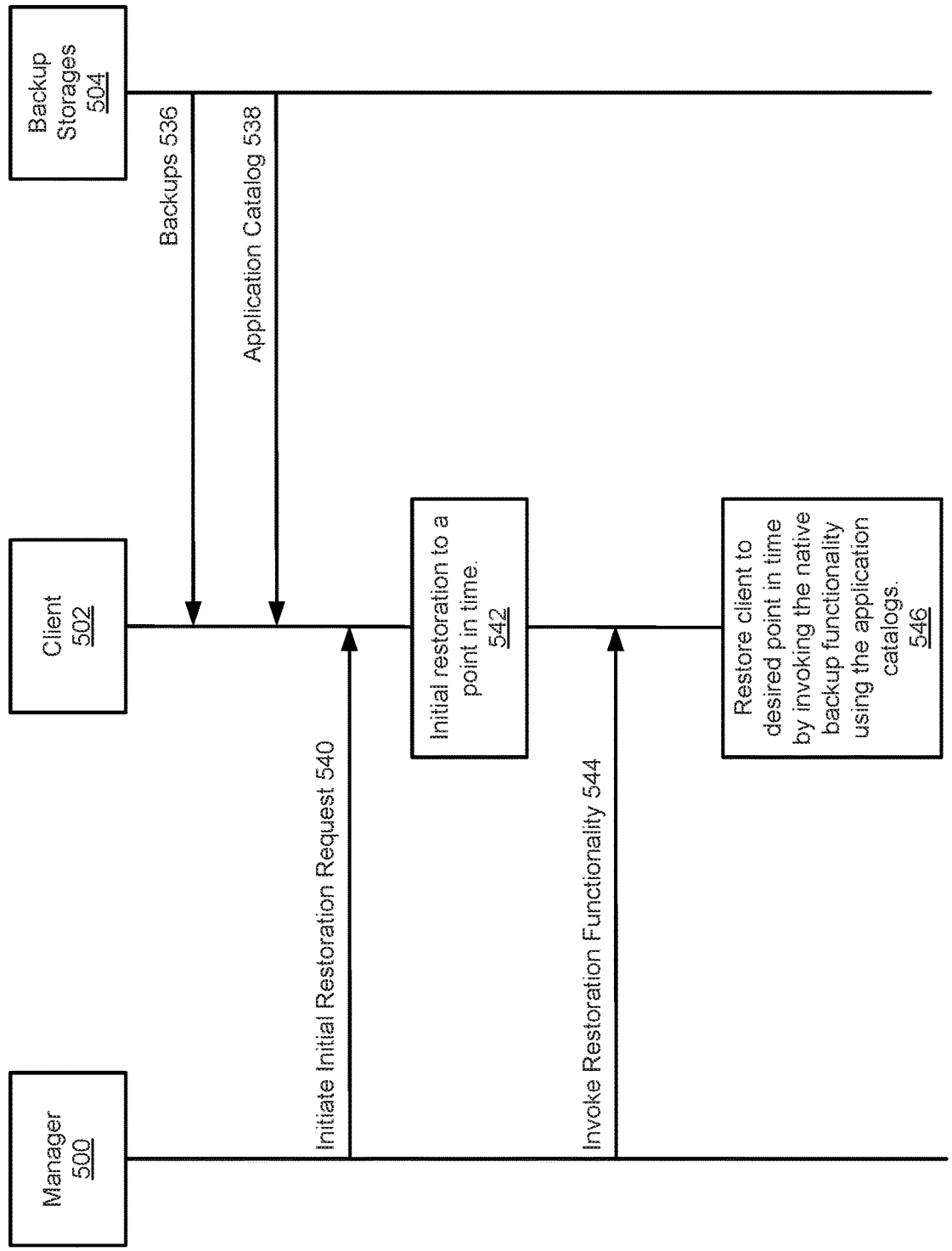

To further clarify aspects of embodiments of the invention, a non-limiting example is provided in FIGS. 5A-5D. FIG. 5A shows a diagram of an example system and FIGS. 5B-5D show diagrams of actions that may be performed by the example system of FIG. 5A. The system of FIG. 5A may be similar to that of FIG. 1. For the sake of brevity, only a limited number of components of the system of FIG. 1 are illustrated in FIG. 5A.

EXAMPLE

Consider a scenario as illustrated in FIG. 5A in which a manager (500) is providing restoration services to a client (502). When providing backup services, the manager (500) utilizes data storage services provided by a backup storage (504).

Turning to FIGS. 5B-5D, the aforementioned figures illustrate interactions and actions between components of the system of FIG. 5A. In these figures, the relative occurrence in time of the interactions progresses from the top of each figure (i.e., earlier in time) to the bottom of each figure (i.e., later in time). FIG. 5D is a continuation of the diagram of FIG. 5C. FIG. 5C is a continuation of the diagram of FIG. 5B. In other words, element 510 indicates the first interaction that occurs in time while element 546 indicates the last interaction that occurs.

At a first point in time, as illustrated in FIG. 5B, the manager (500) sends a backup request (510) to the client (502) that requests a backup be generated based on a protection policy. In response to the backup request (510), the client generates a backup (512) based on native backup functionality of an application hosted by the client (502) and sends the backup (512) to the manager (500). The manager (500) sends an application catalog request (514) to the client (502) that requests an application catalog from the client (502). In response to the request (514) for an application catalog, the client (502) provides an application catalog (516) including information pertaining the generated backup (512) and sends the application catalog (516) to the manager (500).

After obtaining both the backup (512) and the application catalog (516) from the client (502), the manager (500) then sends the backup (518) and the application catalog (520) to the backup storage (504). The backup storage (504) stores the backup (518) and the application catalog (520) for future use.

After storing the backup and application catalog in backup storage (504) for the client (502), the client (502) fails. Turning to FIG. 5C, the failure of the client (502) is indicated by the dashed line descending from the client (502).

At a second point in time after the client failure, the manager identifies one or more backups associated the client (524) to prepare to restore the client (502) so that it will no longer be in a failed state. After identifying the one or more backups associated with the client (514), the manager determines that at least one of the one or more backups requires native restoration functionality (526) of an application hosted by the client (502). In other words, that at least one of the backups was generated by an application hosted by the client (502).

After determining that native restoration functionality (526) is required, the manager (500) sends an instantiation request (528) to a computing device hosting the client (502). After receiving the instantiation request (528) from the manager (500), the computing device instantiates the client (530) by allocating computing resources to the client (502) including storage resources.

After sending the instantiation request (528) to the client (502), the manager (500) identifies an application catalog associated with the client (532). After identifying the application catalog associated with the client (522), the manager (500) sends a message to the backup storage (504) that includes a transfer request (534) to transfer the identified backups associated with the client (524) and the identified application catalog associated with the client (532) from the backup storage (504) to the client (502).

After the manager (500) sends the transfer request (534), the manager (500) initiates restoration of the client (502).

Turning to FIG. 5D, the backups (536) and the application catalog (538) are provided to the client (502). After the client (502) obtains the backups (536) and the application catalog (538), the manager (500) sends a initiation restoration initiation request (540) to the client (502). In response to obtaining the initial restoration initiation request (540), the client (502) performs an initial restoration to a point in time (542) of the client (502) that is not the desired point in time. To do so, data from a full backup of the backups (536) is copied to the storage restores assigned to the instantiated client (530).

After the client (502) performs the initial restoration to the point in time (542), the manager (500) invokes restoration functionality (544) of an application hosted by the initially restored client. In response to the invocation of the restoration functionality (544), application modifies the data stored in the storage resources of the client using an application specific backup of the backups (536) and the application catalog (538) to restore the client (502) to the desired point in time. In other words, the data included in the application catalog (538) is utilized to identify the application to perform the restoration using the application specific backup of the backups (536). The restoration is performed by modifying a portion of the data of the full backup of the backups (536) that was stored in the storage resources allocated to the client during the initiation restoration to the point in time (542) using the application specific backup.

End of Example

Thus, as illustrated in FIGS. 5A-5D, a system in accordance with embodiments of the invention may utilize the native restoration functionality of applications without requiring access to backup use information included in any previous backup. Consequently, the system of FIGS. 5A-5D illustrates that a system in accordance of embodiments of the invention may eliminate the dependence of application specific backups on other types of backups for use of the application specific backups.

Figure 6:
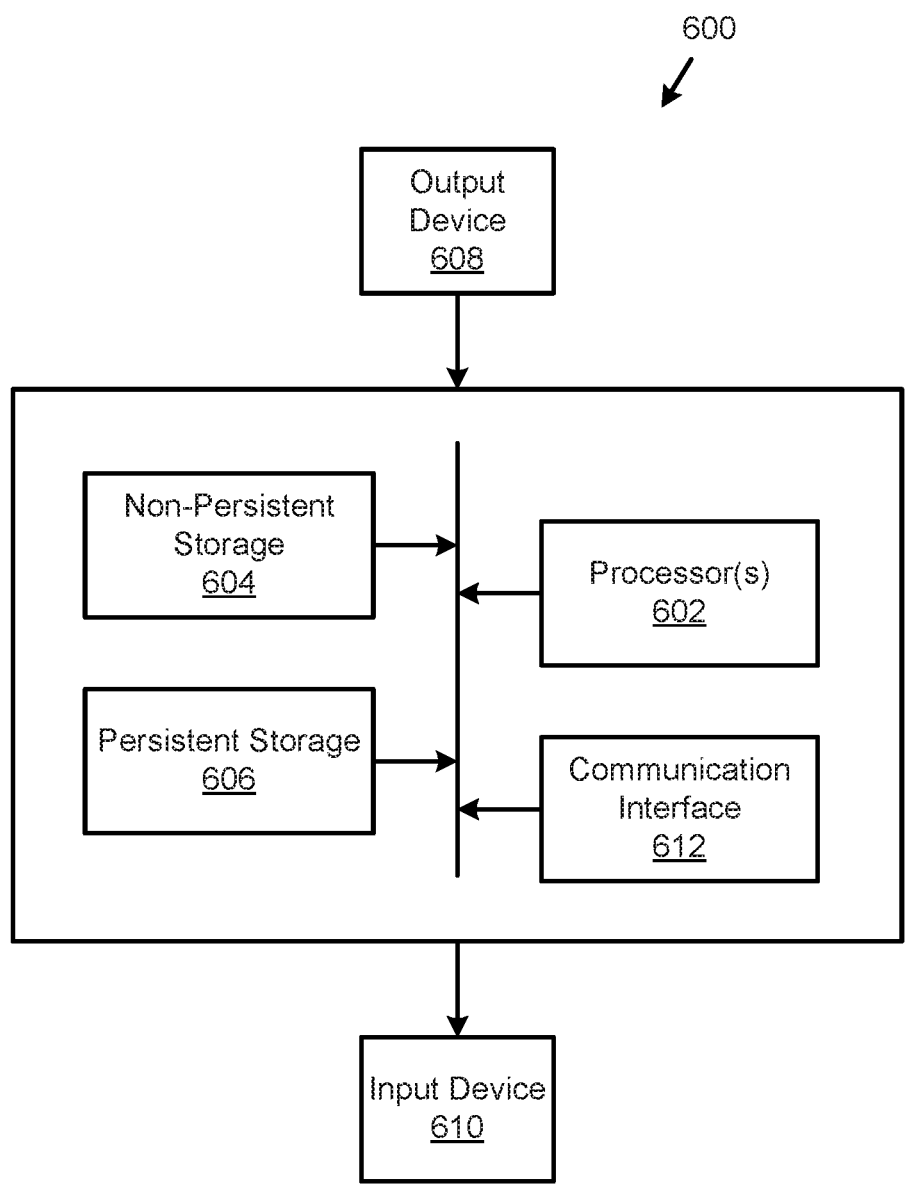
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments of the invention may provide a method for providing backup and/or restoration services using application specific backups. The method may enable application specific backups to be used independently from other types of backups that include use backup use information associated with the application specific backups. To do so, embodiments of the invention may generate application catalogs that include backup use information for application specific backups and/or applications. Consequently, a distributed system in accordance with embodiments of the invention may be resilient to data corruption events that would otherwise render application specific backups to be unusable.

Thus, embodiments of the invention may address the problem of limited computational resource availability for providing backup and/or restoration services in a distributed environment by reducing the likelihood that generated backups are rendered unusable in the future. By doing so, expenditures of computing resources for backup generation purposes may be less likely to be rendered valueless due to data corruption events.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A manager for providing services to clients, comprising:
   persistent storage for storing protection policies; and
   an orchestration manager programmed to:
      obtain a backup from a client of the clients based on a protection policy of the protection policies, wherein the protection policy specifies information regarding requirements for backing up the client;
      make a determination that an application catalog associated with the client is not stored in backup storages;
      in response to making the determination:
         obtain the application catalog from the client;
         store the application catalog in the backup storages; and
         store the obtained backup in the backup storages, wherein:
            the obtained backup comprises an application specific backup generated using native backup generation functionality of an application hosted by the client; and
            the native backup generation functionality is specified by the application catalog;
         after the obtained backup is stored in the backup storages:
            identify a previous backup associated with the client previously stored in the backup storages, wherein the client failed and the previous backup comprises the obtained backup;
            make a second determination that the previous backup requires native restoration functionality; and
            in response to the second determination:
               identify a portion of the application catalog associated with the client using a filter and one or more selection criteria, wherein the selection criteria comprises a timestamp, an asset, and an asset type; and
               invoke the native restoration functionality using the portion of the application catalog and the previous backup to restore the client to a desired point in time.

2. The manager of claim 1, wherein the application catalog comprises:
   a description of the obtained backup;
   an identifier of the application that generated the obtained backup; and
   an identifier of the desired point in time associated with the obtained backup.

3. The manager of claim 1, wherein the application catalog is associated with the client when stored in the backup storages.

4. The manager of claim 1, wherein the orchestration manager is further programmed to:
   obtain a second backup from the client of the clients;
   make a third determination that the second backup was not generated using native backup generation functionality of any application of the client; and
   in response to making the third determination:
      store the second backup in the backup storages without determining whether the application catalog is stored in the backup storages.

5. The manager of claim 1, wherein obtaining the backup comprises:
   invoking the native backup generation functionality of the application hosted by the client to generate the obtained backup.

6. The manager of claim 5, wherein the obtained backup is stored in a format usable only by applications of a type of the application.

7. A method for operating a manager for providing services to clients, comprising:
   obtaining a backup from a client of clients based on a protection policy of protection policies, wherein the protection policy specifies information regarding requirements for backing up the client;
   making a determination that an application catalog associated with the client is not stored in backup storages;
   in response to making the determination:
      obtaining the application catalog from the client;
      storing the application catalog in the backup storages;
         storing the obtained backup in the backup storages, wherein:
            the obtained backup comprises an application specific backup generated using native backup generation functionality of an application hosted by the client; and
            the native backup generation functionality is specified by the application catalog;
      after the obtained backup is stored in the backup storages:
         identify a previous backup associated with the client previously stored in the backup storages, wherein the client failed and the previous backup comprises the obtained backup;
         make a second determination that the previous backup requires native restoration functionality; and
         in response to the second determination:
            identify a portion of the application catalog associated with the client using a filter and one or more selection criteria, wherein the selection criteria comprises a timestamp, an asset, and an asset type; and invoke the native restoration functionality using the portion of the application catalog and the previous backup to restore the client to a desired point in time.

8. The method of claim 7, wherein the application catalog comprises:

a description of the obtained backup;

an identifier of the application that generated the obtained backup; and an identifier of a point in time associated with the obtained backup.

9. The method of claim 7, wherein the application catalog is associated with the client when stored in the backup storages.

10. The method of claim 7, further comprising:

obtaining a second backup from the client of the clients;

making a third determination that the second backup was not generated using native backup generation functionality of any application of the client; and in response to making the third determination:

storing the second backup in the backup storages without determining whether the application catalog is stored in the backup storages.

11. The method of claim 7, wherein obtaining the obtained backup comprises:

invoking the native backup generation functionality of the application hosted by the client to generate the obtained backup.

12. The method of claim 11, wherein the obtained backup is stored in a format usable only by applications of a type of the application.

13. A non-transitory computer readable medium comprising computer readable program code, which when executed by a computer processor enables the computer processor to perform a method for operating a manager for providing services to clients, the method comprising:

obtaining a backup from a client of the clients based on a protection policy of protection policies, wherein the protection policy specifies information regarding requirements for backing up the client;

making a determination that an application catalog associated with the client is not stored in backup storages;

in response to making the determination:

obtaining the application catalog from the client;

storing the application catalog in the backup storages;

storing the obtained backup in the backup storages, wherein:

the obtained backup comprises an application specific backup generated using native backup generation functionality of an application hosted by the client; and the native backup generation functionality is specified by the application catalog;

after the obtained backup is stored in the backup storages:

identify a previous backup associated with the client previously stored in the backup storages, wherein the client failed and the previous backup comprises the obtained backup;

make a second determination that the previous backup requires native restoration functionality; and in response to the second determination:

identify a portion of the application catalog associated with the client using a filter and one or more selection criteria, wherein the selection criteria comprises a timestamp, an asset, and an asset type; and invoke the native restoration functionality using the portion of the application catalog and the previous backup to restore the client to a desired point in time.

14. The non-transitory computer readable medium of claim 13, wherein the application catalog comprises:

a description of the obtained backup;

an identifier of the application that generated the obtained backup; and an identifier of a point in time associated with the obtained backup.

15. The non-transitory computer readable medium of claim 13, wherein the application catalog is associated with the client when stored in the backup storages.

16. The non-transitory computer readable medium of claim 13, wherein the method further comprises:

obtaining a second backup from the client of the clients;

making a third determination that the second backup was not generated using native backup generation functionality of any application of the client; and in response to making the third determination:

storing the second backup in the backup storages without determining whether the application catalog is stored in the backup storages.

17. The non-transitory computer readable medium of claim 13, wherein obtaining the obtained backup comprises:

invoking the native backup generation functionality of the application hosted by the client to generate the obtained backup.

* * * * *